United States Patent [19]

Mir

[11] 4,374,397

[45] Feb. 15, 1983

[54] LIGHT VALVE DEVICES AND ELECTRONIC IMAGING/SCAN APPARATUS WITH LOCATIONALLY-INTERLACED OPTICAL ADDRESSING

[75] Inventor: José M. Mir, Rochester, N.Y.

[73] Assignee: Eastman Kodak Company, Rochester, N.Y.

[21] Appl. No.: 268,975

[22] Filed: Jun. 1, 1981

[51] Int. Cl.³ .............................................. H04N 1/22
[52] U.S. Cl. .......................................... 358/75; 355/4; 358/296; 358/78
[58] Field of Search ....................... 358/75, 78, 60, 61, 358/213, 285, 286, 296, 300, 302; 355/4, 5, 18, 32, 37, 38, 67, 70, 71; 350/370, 374, 378, 380, 400, 403; 353/20

[56] References Cited

U.S. PATENT DOCUMENTS

| | | | |
|---|---|---|---|
| 3,428,743 | 2/1969 | Hanlon | 358/61 |
| 3,470,310 | 9/1969 | Shashoua | 358/61 |
| 3,891,560 | 6/1975 | Chester | 358/61 |
| 3,930,119 | 12/1975 | Schmidt | 358/285 |
| 4,129,357 | 12/1978 | Frosch | 350/403 |
| 4,229,095 | 10/1980 | Mir | 358/75 |
| 4,294,524 | 10/1981 | Stolov | 358/59 |
| 4,316,196 | 2/1982 | Jacobs | 350/356 |

*Primary Examiner*—Michael A. Masinick
*Attorney, Agent, or Firm*—John D. Husser

[57] ABSTRACT

A light valve device for locationally-interlaced, optical addressing of an imaging or scan zone includes an array having a plurality of location-address sectors, each including a plurality of discrete light valve pixel portions which are electrically addressable to control the passage of light. Each light valve pixel portion is coupled for common electrical address with one light valve pixel portion of each of the other location-address sectors, so as to form inter-sector groups, but is independently addressable with respect to light valve pixel portions of its own location-address group.

9 Claims, 7 Drawing Figures

LIGHT VALVE DEVICES AND ELECTRONIC IMAGING/SCAN APPARATUS WITH LOCATIONALLY-INTERLACED OPTICAL ADDRESSING

CROSS-REFERENCE TO RELATED APPLICATIONS

Reference is made herein to U.S. patent application Ser. No. 230,099, entitled "Light Valve Imaging Apparatus Having Improved Addressing Electrode Structure and filed Jan. 29, 1981, in the names of J. M. Mir and J. R. Varner.

BACKGROUND OF THE INVENTION

1. Field of the Invention

The present invention relates to light valve devices and apparatus (e.g., electronic imaging apparatus) using such devices, and more specifically to such devices and apparatus having improved addressing configurations and modes.

2. Description of the Prior Art

Recently, it has been found that light valve devices provide a highly useful vehicle in electronic imaging. One preferred light valve configuration comprises a piece of ferro-electric ceramic material, such as lanthanum-doped lead zirconate titanate (PLZT), which is sandwiched between crossed polarizers and electrically activatible to operate in a Kerr cell mode. An array of such light valves comprises such crossed polarizers and a panel of PLZT material that has a plurality of electrodes formed on one of its major surfaces. The electrodes are arranged in a manner facilitating the selective application of discrete electrical fields across (in a direction perpendicular to the direction of viewing) discrete surface areas which constitute picture element portions (pixels) of the panel. Upon application of such fields, the PLZT material becomes birefringent and rotates the direction of polarization of incident light by an extent dependent on the field magnitude. This results in transmission of light through the PLZT pixels and cooperating polarizers varying as a function of the respective addressing fields.

My U.S. Pat. No. 4,229,095 discloses various embodiments of electronic color-imaging apparatus that utilize such light valve arrays to effect multicolor exposure of panchromatic recording media. For example, a color image is formed electronically by selectively opening and closing individual light valves of such arrays in synchronization with the energization of red, green and blue exposing sources and according to the red, green and blue color information for the pixels of that image. One preferred embodiment disclosed in that patent comprises a linear light valve array disposed in spaced transverse relation to the recording media feed path. The pixels of the array are addressed concurrently with image information, a line at a time, and the movement of the recording medium, and the red, green and blue color exposures are synchronized with successive actuations of the linear array.

It can be appreciated that light valves must address many image pixels per line in order to form images having even moderate detail. The number of pixels per line increases in accordance with the resolution requirements of the imaging application, e.g., becoming as large as 250 pixels per inch or larger for high quality continuous tone imaging. Each pixel of the recording medium must be independently addressable with light in accordance with the unique content of the image to be reproduced. Therefore, discretely activatable electrode means has been provided for each pixel portion of the light valve array, and each electrode means has had its own high voltage "off-on" switch, e.g., a transistor amplifier. The cost and complexity of these many switches and their connection and packaging present problems in electronic imaging with light valve devices.

One solution to minimize such problems is to provide a smaller number of transversely-spaced pixel portions in the light valve array and then effect multiple passes of the recording medium, with a transverse-indexing of the array (or recording medium) between passes. Thus, if light valve pixel portions are spaced with a three-pixel inter-space and the recording medium is transported past the light valve array four times, only one-fourth the usual number of high voltage switches is required. However, multiple passes require additional time and can present registration problems.

SUMMARY OF THE INVENTION

An important purpose of the present invention is to provide improved configurations and modes for light valve devices that are useful, for example in electronic imaging apparatus, so as to ameliorate the problems outlined above. A significant advantage of the present invention is the reduction in cost and complexity of electronic addressing structure for such devices and apparatus, without the necessity of multiple passes of the recording medium.

The above and other objects and advantages are accomplished in accordance with the present invention by providing a locationally-addressing light valve array having a plurality of location-address sectors, each sector including a plurality of discrete light valve pixel portions which are electronically addressable to control the passage of light. Each of these discrete pixel portions is electrically coupled to one corresponding light valve pixel portion of each of the other location-address sectors (forming inter-sector groups), but is electrically independent of other light valve pixel portions in its own location-address sector. In accord with a highly advantageous embodiment of the present invention, means for electrically addressing this light valve array include a plurality of switch means, each selectively activatible to couple a respective inter-sector group of pixel portions to energizing voltage, and control means for sequentially activating said switch means.

In one advantageous aspect of the invention this locationally-addressing array is used in cooperation with an informationally-addressing light valve array comprising a plurality of discrete information-address sectors which are independently electrically addressable to control passage of light. Each of the information-address sectors is optically aligned with a respective location-address sector of the locationally-addressing array. Thus, when light is directed to an exposure or scan station via both of those arrays, inter-sector pixel groups of the locationally-addressing array can be sequentially addressed, in coordination with the informational address of the sectors of the informationally-addressing array, to effect locationally-interlaced exposure of a recording medium.

In another advantageous aspect the locationally-addressing array is predeterminedly located, between a source which illuminates a record member and an array of discrete electro-optic detectors, so that each of the detectors is optically aligned with a respective one of the location-address sectors. Sequential activation of the inter-sector pixel groups thus effects locationally-interlaced scanning of the record member. In a further aspect of the present invention, the locationally-interlaced imaging configuration is used in cooperation with the locationally-interlaced scanning configuration as parts of a scanner/printer apparatus.

Other advantageous constructions and features of the present invention will become apparent to one skilled in the art when considering the subsequent, more detailed description of preferred embodiments. This description is set forth with reference to the attached drawings wherein:

DETAILED DESCRIPTION OF THE PREFERRED EMBODIMENTS

Figure 1:
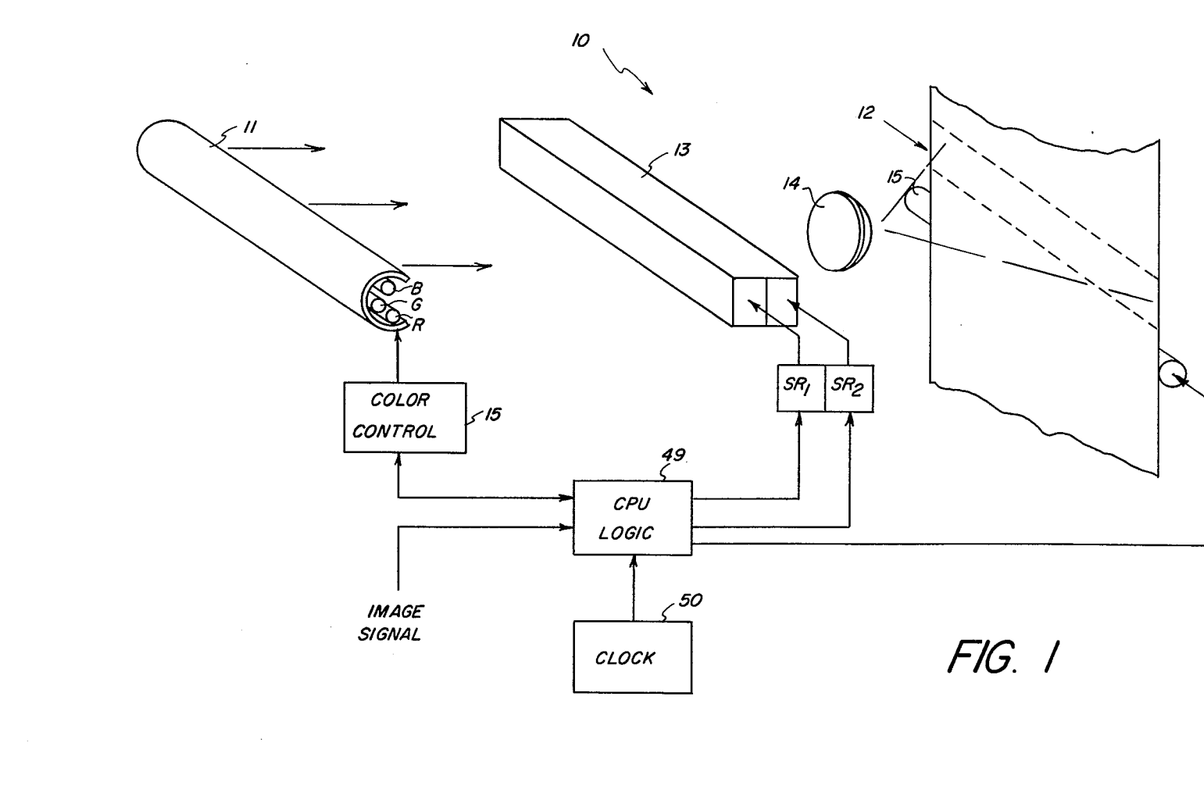
FIG. 1 is a schematic illustration of one embodiment of electronic imaging apparatus in accordance with the present invention.

Referring now to FIG. 1, there is shown one illustrative embodiment of electronic imaging apparatus 10 incorporating structural and functional improvements in accordance with the present invention. In general, the apparatus 10 comprises an illumination source 11 which directs flood illumination toward an imaging zone 12 via a light valve imaging device 13 and imaging lens 14. As is known in the art, it is the general function of such apparatus for imaging device 13 to modulate light from source 11, pixel by pixel, in accordance with the image to be reproduced. In the illustrated embodiment the light valve imaging device 13 is a linear array and is disposed to control the passage of light to successive transverse strip portions of a light-sensitive recording medium M as it is moved past the imaging zone 12, e.g. by drive means 15. Apparatus 10 is adapted for electronic color imaging, and separate red (R), green (G) and blue (B) light sources are provided at source 11 for sequential energization by control 15 during line imaging periods. It will be appreciated from the subsequent description that the structural approach of the present invention has significant advantage in many other electronic imaging configurations, e.g. where only one color light is used or in an area light valve array configuration where the image medium remains stationary during exposure.

The improvements of apparatus 10, according to the present invention, pertain to the light valve imaging device 13, including its addressing, and will be described in more detail below. However, first a brief description of a typical prior art light valve array and address structure will be helpful in appreciating the advantages of the present invention.

Figure 2:
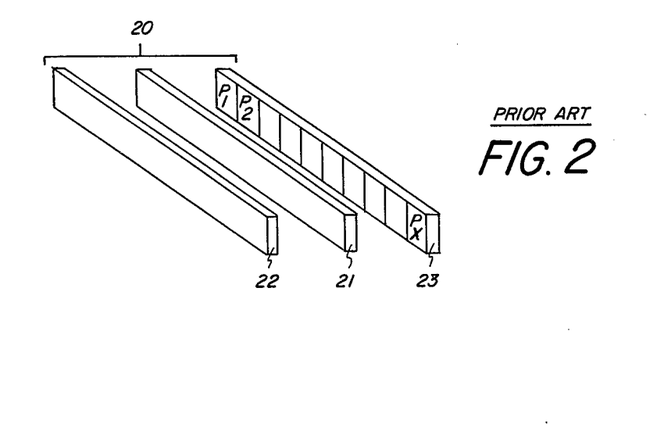
FIGS. 2 and 3 are schematic views of prior art light valve array configurations and addressing means.
Figure 3:
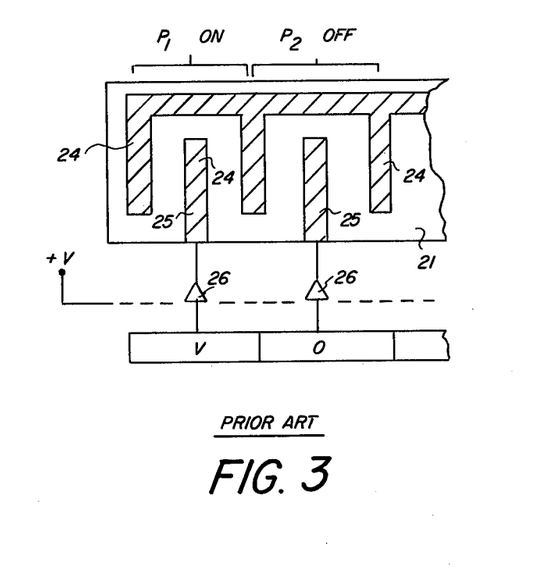

Thus, the linear light valve array 20 shown in FIG. 2 comprises a plurality of discrete, separately-addressable pixel portions $P_1$, $P_2$ ... $P_x$ on a PLZT panel 21 and cooperating crossed polarizers 22 and 23. Prior art address means for light valve array 20 is shown in more detail in FIG. 3 where it can be seen that pixel portions $P_1$ and $P_2$ are defined by a common ground electrode 24 and independently addressable electrodes 25, all formed on panel 21. High voltage electronic switches 26 (e.g. transistor amplifiers) are provided to selectively energize electrodes 25 of each pixel portion, with voltage V, in response to a signal from addressing control means 27, e.g. a serial-in, parallel-out shift register. In addressing the light valve 20, each of the elements of shift register 27 are loaded with information signals ("V" or "O") in accordance with the appropriate "on or off" condition for the image pixel portion corresponding to its coupled pixel portion of the light valve array 20. Upon output of these signals from the shift register 27, the switches 26 appropriately energize, or leave unenergized, electrodes 25. Thus, each pixel portion of light valve array 20 requires its own high voltage electronic switch 26 to isolate the low-voltage signal circuitry, including shift register 27, from the high-voltage energizing circuitry including electrodes 25.

Figures 4, 5:
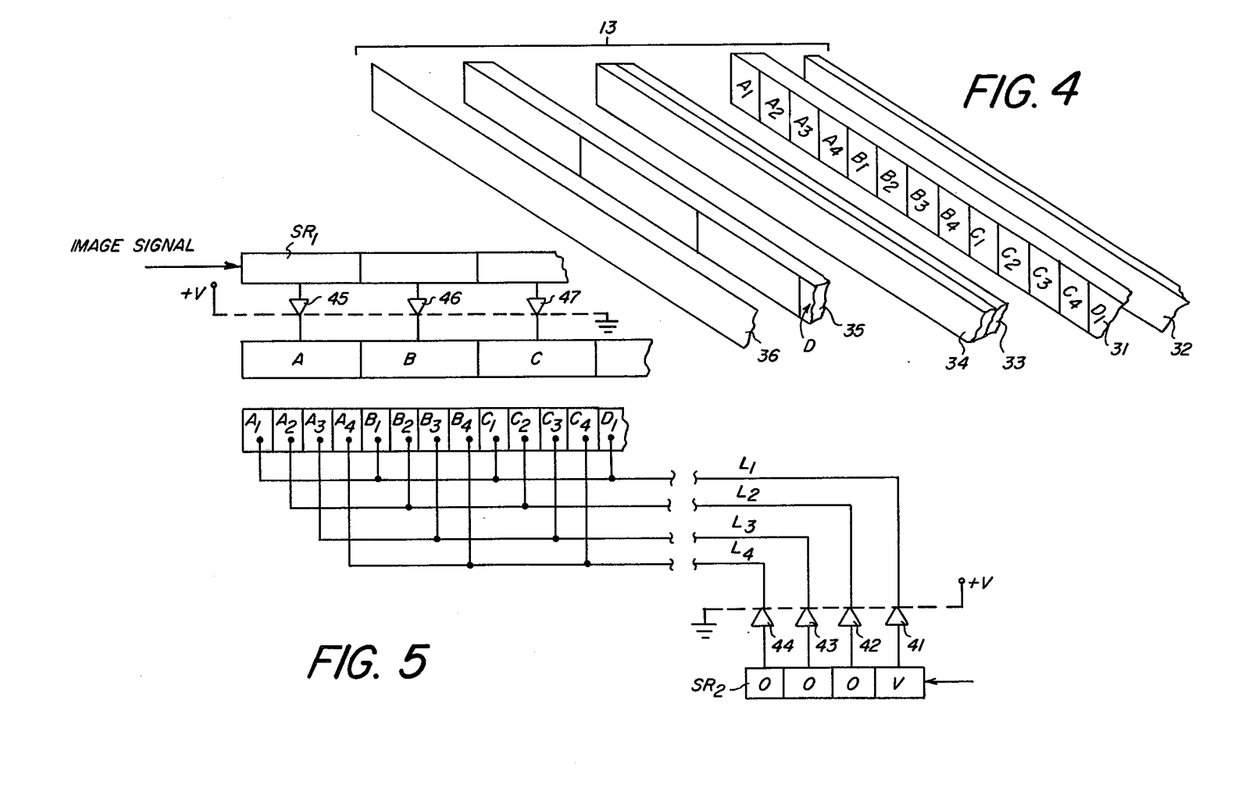
FIG. 4 is an enlarged perspective view of one embodiment of light valve device in accordance with the present invention, which is useful, for example, in the FIG. 1 embodiment of the present invention.
FIG. 5 is a diagram illustrating one preferred embodiment of addressing electronics for use with the light valve array shown in FIG. 4.

Referring now to FIGS. 4 and 5, there is shown one preferred embodiment, in accord with this invention, for the light valve device of the FIG. 1 embodiment. Thus, light valve imaging device 13 comprises a high-resolution, locationally-addressing light valve array which includes addressable electro-optic panel 31, formed for example of PLZT ceramic material, and cooperating crossed polarizing means 32 and 33. It will be appreciated that although the portions of the FIG. 4 structure are shown in spaced relation, they usually will be contiguous. The panel 31 comprises a plurality of discrete pixel portions $A_1$, $A_2$ ... ; $B_1$, $B_2$ ... ; $C_1$, $C_2$ ... ; etc., which are defined along the length of the panel by grounding and addressing electrode structure. The addressing electrode structure can be like that shown in FIG. 3, or more preferably, like that disclosed in U.S. patent application Ser. No. 230,099, entitled "Light Valve Imaging Apparatus Having Improved Addressing Electrode Structure" and filed Jan. 29, 1981, in the names of J. M. Mir and J. R. Varner.

In accordance with the present invention, the addressing electrodes within the different location-address sectors, viz. $A_1$–$A_4$, $B_1$–$B_4$, $C_1$–$C_4$, etc., of the panel 31, are energizable independently of the other electrodes comprising such a sector. That is, the addressing electrode for pixel portion $A_1$ is energizable independently of the electrodes for pixel portions $A_2$, $A_3$ and $A_4$. However, as shown in FIG. 5, each addressing electrode, within the location-address sectors, is electrically coupled to one corresponding addressing electrode in each of the other sectors. Thus, addressing electrodes of pixel portions $A_1$, $B_1$, $C_1$, $D_1$ are connected to a common electrical bus line $L_1$ and form an inter-sector pixel portion group of the locationally-addressing light valve array. Similarly, the $A_2$, $B_2$, $C_2$ electrodes are coupled to bus line $L_2$, the $A_3$, $B_3$, $C_3$ electrodes are coupled to bus line $L_3$ and the $A_4$, $B_4$, $C_4$ electrodes are coupled to bus line $L_4$ to form other inter-sector groups.

The electrode bus lines $L_1$, $L_2$, $L_3$ and $L_4$ respectively are coupled to high voltage switches 41, 42, 43 and 44, e.g. transistor amplifiers. Those switches are adapted to selectively energize their respective buses (and the coupled addressing electrodes) with a high voltage "V" in response to location-address signals from location-address means SR-2, e.g. a shift register or a resettable counter. For example, address means SR-2, bearing signals as indicated would activate switch 41 to an "on" condition but leave switches 42, 43, 44 in the "off" condition. Thus, pixel portions $A_1$, $B_1$, $C_1$, etc., would be turned to an "on" (light transmitting) condition by their addressing electrodes, but the remaining illustrated electrodes would remain "off". In successive portions of a line period, switches 42, 43 and 44 are respectively switched "on" with all other switches "off" so that within each line period all pixel portions of the modulator panel 31 have been turned "on" in an interlaced fashion.

It is to be noted that the structure thus far described does not provide imagewise control of light passing to the exposure zone. Instead, it provides locationally-interlaced optical addressing of a line at imaging zone 12. Further, it should be noted at this stage, that only four high voltage switches are utilized for twelve pixels as compared to one for each pixel portion in prior art devices. It will be understood that the electronic economy of this configuration is significantly more than represented by the FIGS. 4 and 5 illustration, because light valve panels 31 for a complete line will have many more pixel portions than shown, e.g. 200 per inch.

How the locationally-addressing light valve structure described above can be utilized to accomplish improved electronic imaging in accordance with the present invention, can be understood by considering the remaining structure shown in FIGS. 4 and 5. Thus, light valve imaging device 13 further comprises a low-resolution, informationally-addressing light valve array comprising addressable electro-optic panel 35 sandwiched between polarizers 34 and 36. Polarizer 34 has the same polarization direction as polarizer 33 and both are crossed with respect to polarizer 36. It can be seen that light introduced through polarizer 36 will only pass polarizers 33-34 if rotated 90° by the energization pixel portions A, B, C, etc., of panel 35. Similarly, light which does pass polarizers 33-34 will only pass polarizer 32 (which also is crossed with respect to polarizers 33-34) if rotated 90° by the energization of the pixel portions of locationally-addressing panel 31. The relative location of panels 31 and 35 can be inter-changed with the same optical effects resulting. Polarizers 34-35 can be a single polarizing means; however, dual polarizers are preferred for maximum light contrast between on-off conditions.

As shown in FIGS. 4 and 5, the low-resolution, information address sectors A, B, C, etc., of panel 35 are optically aligned with respective location-address sectors $A_1$-$A_4$, $B_1$-$B_4$, $C_1$-$C_4$, etc., of panel 31. Referring to FIG. 5, it can be seen that each of information-address sectors A, B, C of panel 35 have their addressing electrodes (not shown but preferably of the kind disclosed in aforementioned U.S. patent application Ser. No. 230,099) connectable to a source of high voltage "V" by high voltage switch means 45, 46, 47, respectively. Switch means 45, 46, 47 are in turn actuatable between an off-on condition by serial-in, parallel-out shift register SR-1. As described in more detail below, successive sets of information signals (each containing information representative of a plurality of spaced image pixels along a line of the image to be reproduced) are cyclically input to the shift register SR-1 and output in synchronization with the activation of switches 41–44 by SR-2, the energization of light source 11 and the movement of image medium M.

Referring again to FIG. 1 as well as FIGS. 4 and 5, one preferred mode of operation for electronic imaging in accordance with the present invention can be described. Thus, while a given line of the recording medium M is in the exposure station 12, color control 15, acting in response to signals from central processing unit (CPU) 49 and clock 50 effects at least three sequential light exposure periods, one each of red, green and blue light. During each such light exposure period locationally-addressing light valve panel 31 is actuated under control of unit 49 and SR-2, sequentially turning on the inter-sector pixel groups $A_{,1}$, $B_1$, $C_1$, through $A_4$, $B_4$, $C_4$, etc. During each activation of an inter-sector pixel group of locationally-addressing panel 31, appropriate image information is input to register SR-1 for informationally-addressing panel 35.

For example, if the image to be reproduced requires red light exposure of pixel $A_1$ (of a line of the recording medium then located at the exposure zone), information address sector A will be energized to an "on" condition during the sub-period of locational-address by panel 31 that energizes the inter-sector pixel group containing pixel portion $A_1$. If the $B_1$ pixel of that line also required red light, information address sector B would also be energized during this sub-period; otherwise it would not. During recording of a complete line of three-color information, this sequence is repeated for each inter-sector group of locationally-addressing panel 31 and for each light color. It will be appreciated that the information signals input to shift register SR-1 for panel 35 must be properly formatted to correspond with the electrode connections of panel 31 and the activation program of register SR-2. Various means to accomplish proper signal format will occur to those skilled in the art based on the foregoing description.

Figure 6:
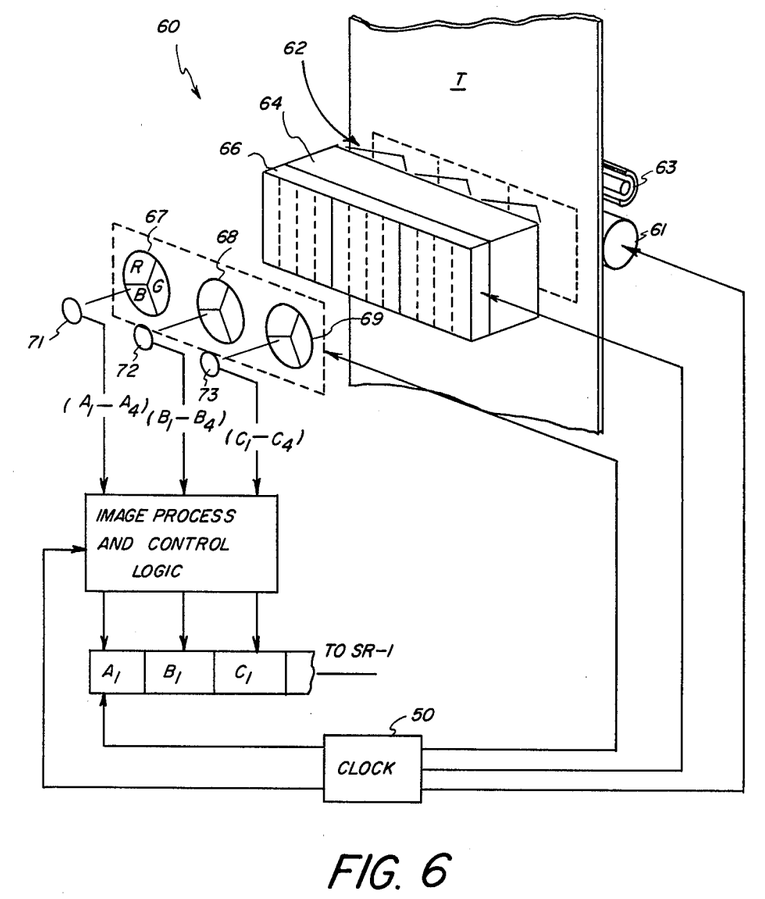
FIG. 6 is a schematic perspective view showing one embodiment of a locationally-interlaced-scan device in accordance with the present invention.

One preferred mode to obtain a properly formatted signal, directly from the detecting-scan of a record member to be reproduced, is illustrated in FIG. 6. This embodiment also illustrates the independent utility of the present invention's locationally-addressing, light valve array configuration as a detecting scanner. As shown in FIG. 6, a record member T (e.g. a transparency image to be reproduced by electronic imaging apparatus 10) is moved along a scan path past scanning detector 60 by drive means 61, which is controlled, e.g. by a known servo device under the regulation of clock 50. Note, in this embodiment clock 50 also regulates CPU 49 of imaging apparatus 10.

As transparency T moves past scan station 62, successive line portions are illuminated by source 63. Imaging optics 64, e.g. an array of gradient index fiber lenses, are located on the opposite side of the scan station and direct light that is transmitted by the transparency to light valve scan array 66. Array 66 is constructed with the same elements 31, 32, 33 as shown in FIG. 4 and has addressing means like that shown for panel 31 in FIG. 5.

Thus different inter-sector groups of pixel portions of scanning light valve array 66 are energized in succession as described previously, and during their "on" condition transmit light passing through the transparency T. Color filter discs 67, 68, 69, etc., are rotated between photodetectors 71, 72, 73, etc., and respective locational-address sectors of array 66. The rotation of filters is controlled by clock 50 to be in proper timed relation with the color exposure periods of the imaging apparatus 10. Clock 50 also controls the successive, locationally-interlaced activations of inter-sector groups of light valve array 66 to provide a complete interlaced line scan during each color period (in proper timed relation with corresponding activations of inter-sector groups of panel 31).

Thus signals from detectors 71, 72, 73, etc., will comprise the proper image information (for each pixel portion of each line of the transparency T), in the proper format, to address to shift register SR-1 of apparatus 10 in proper timed relation with the activation of array 31 by its address means SR-2. As indicated in FIG. 6, the parallel signals from the detectors are transformed to a serial form by parallel-to-serial shift register 76, after having any desired image-enhancement signal processing performed thereon by image process and control logic 77.

Although the FIG. 6 scanner embodiment is one useful configuration, record members to be reproduced can also be scanned by conventional scanners (e.g. flying spot scanners or CCD arrays). Proper signal formatting is then effected with dedicated hardware and/or software.

Figure 7:
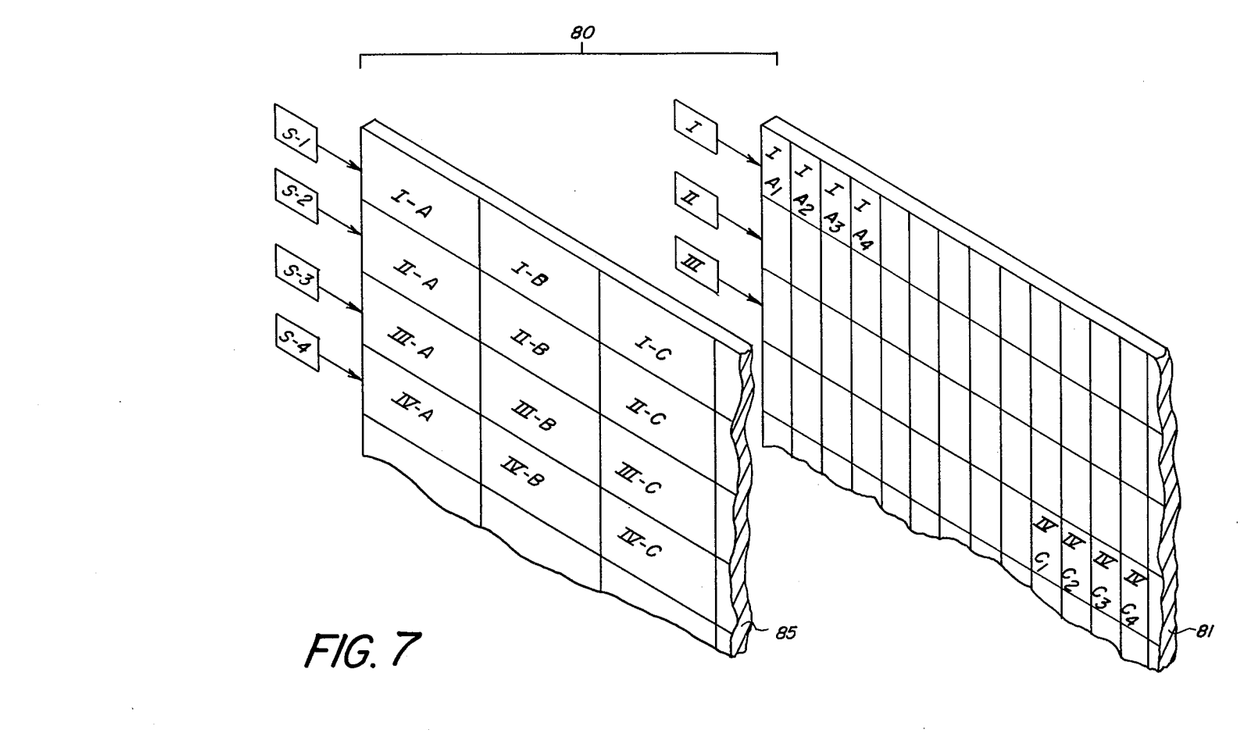
FIG. 7 is a schematic perspective view showing one embodiment of an area light valve device constructed in accordance with the present invention.

Referring now to FIG. 7, an alternate embodiment of the present invention is shown. Specifically, area array 80 comprises high-resolution locationally-addressing panel 81 and low-resolution informationally-addressing panel 85. Area polarizers (not shown) are provided between and on each end of the light valve arrays, with polarization directions as described with respect to the FIG. 4 linear array configuration. A plurality of location-address means I, II, III, etc., each such as SR-2 shown in FIG. 5 for array 31, are provided respectively for each linear row of area array 81. Likewise, information-address shift registers S-1, S-2, S-3 and S-4 are provided to control low-resolution information sectors I-A through IV-C, etc. Thus, it will be appreciated that by operating each row of locationally-addressing area array 81 in the mode described with respect to FIGS. 4 and 5 and similarly coordinating the activation of corresponding rows I-IV of low-resolution area array 85, a stationary recording medium can be imaged in an electrically efficient fashion similar to that previously described with respect to linear array embodiments.

The invention has been described in detail with particular reference to certain preferred embodiments thereof, but it will be understood that variations and modifications can be effected within the spirit and scope of the invention.

What is claimed is:

1. A light valve device for locationally-interlaced, image addressing of an exposure station, said device comprising:
(a) a first linear light valve array adapted for optical alignment with a line at such exposure station, said first array having a plurality of location-address sectors that each include a plurality of discrete light valve pixel portions which are electrically addressable to control the passage of light, each light valve pixel portion being coupled for common electrical address, in an inter-sector group, with one light valve pixel portion of each of the other location-address sectors, but independently addressable with respect to the other light valve pixel portions of its own location-address sector; and
(b) a second linear light valve array having a plurality of information-address sectors which are each independently electrically addressable to control passage of light, said second array being supported with respect to said first array so that each of said information-address sectors is in optical alignment with a respective location-address sector of said first array, whereby successive inter-sector groups of pixel portions of said first array can be sequentially addressed in timed relation with informational address of said second array sectors to effect complete imagewise address of a line at an exposure station.

2. The invention defined in claim 1 further comprising:
(c) means for electrically addressing said first linear array including a plurality of location-switch-means each activatible to couple a respective inter-sector group of pixel portions to energizing voltage and first control means for sequentially activating said location-switch-means; and
(d) means for electrically addressing said second linear array including a plurality of information-switch-means each selectively activatible to couple a respective information-address sector to energizing voltage and second control means for selectively activating said information-switch-means in parallel, in accordance with image information.

3. In electronic imaging apparatus of the kind having means for supporting recording media at an imaging station, means for directing illumination toward said imaging station and light valve means, located between said illuminating means and said supporting means, for imagewise modulating such light in accordance with image information, the improvement wherein said light valve means comprises:
(a) a first linear light valve array optically aligned with a line of such exposure station, said first array having a plurality of location-address sectors that each include a plurality of discrete light valve pixel portions which are electrically addressable to control the passage of light, each light valve pixel portion being coupled for common electrical address, in an inter-sector group, with one light valve pixel portion of each of the other location-address sectors, but independently addressable with respect to the other light valve pixel portions of its own location-address sector;
(b) a second linear light valve array supported in optical alignment with said first array, said second array having a plurality of information-address sectors which are each independently electrically addressable to control passage of light, each of said information-address sectors of said second array being located in optical alignment with a respective location-address sector of said first array;
(c) means for electrically addressing said first linear array including a plurality of location-switch-means, each activatible to couple a respective inter-sector group of pixel portions to energizing voltage, and first control means for sequentially activating said location-switch-means; and
(d) means for electrically addressing said second linear array including a plurality of information-switch-means, each selectively activatible to couple a respective information-address sector to energizing voltage, and second control means for activating said information-switch-means in parallel in accordance with image information.

4. The invention defined in claim 3 further comprising means for synchronizing said first and second control means to effect complete imagewise address of a line of such recording medium at said imaging station.

5. The invention defined in claim 3 wherein said electronic imaging apparatus further comprises a locationally-interlaced-scan device including:
(e) means for positioning a record element at a scan station;
(f) scan light source means for directing uniform scan light toward a line at said detection station;
(g) a linear light valve scan array which is optically aligned with a line of said scan station, said scan array having a plurality of location-address sectors that each include a plurality of discrete light valve pixel portions which are electrically addressable to control the passage of light, each light valve pixel portion being coupled for common electrical address, in an inter-sector group, with one light valve pixel portion of each of the other location-address sectors, but being independently addressable with respect to the other light valve pixel portions of its own location-address sector;
(h) a plurality of electro-optic detectors located, optically, on the opposite side of said scanning light valve array from said scan light source means, each of said detectors being located in optical alignment with a respective location-address sector of said scan array; and
(i) scan control means for sequentially addressing the respective inter-sector groups of said scan array in synchronization with the sequential address of said first control means and for supplying signals from said electro-optic detectors respectively to said second control means.

6. A light valve device for locationally-interlaced, optical addressing of an image exposure or scan station, said device comprising a linear light valve array adapted for optical alignment with a line of such station, said array having a plurality of location-address sectors that each include a plurality of discrete light valve pixel portions which are electrically addressable to control the passage of light, each light valve pixel portion being coupled for common electrical address, in an inter-sector group, with one light valve pixel portion of each of the other location-address sectors, but independently addressable with respect to the other light valve pixel portions of its own location-address sector.

7. The invention defined in claim 6 further comprising a plurality of electro-optic detectors, each of said detectors being located in optical alignment with a respective location-address sector of said array.

8. The invention defined in claim 6 further comprising means for electrically addressing said array including a plurality of switch means, each selectively activatible to couple a respective inter-sector group of pixel portions to energizing voltage.

9. The invention defined in claim 8 further comprising control means for sequentially activating said switch means.

* * * * *